US012804030B2

(12) United States Patent
Thomas et al.

(10) Patent No.: US 12,804,030 B2
(45) Date of Patent: Nov. 17, 2026

(54) SYSTEM AND METHOD FOR HORIZONTAL SCALING OF MULTI-TENANT WEB APPLICATIONS

(71) Applicant: WORKDAY, INC., Pleasanton, CA (US)

(72) Inventors: Melbin Thomas, Dublin (IE); Suhina Relhan, Dublin (IE); Rishi Chail, Kildare (IE); Amarendra Rapuru, Athlone (IE); Chandratap Kar, Dublin (IE); Christof Bornhoevd, Belmont, CA (US)

(73) Assignee: WORKDAY, INC., Pleasanton, CA (US)

( * ) Notice: Subject to any disclaimer, the term of this patent is extended or adjusted under 35 U.S.C. 154(b) by 23 days.

(21) Appl. No.: 18/931,164

(22) Filed: Oct. 30, 2024

(65) Prior Publication Data

US 2026/0122124 A1 Apr. 30, 2026

(51) Int. Cl.

| | |
|---|---|
| ***G06F 16/23*** | (2019.01) |
| ***H04L 9/40*** | (2022.01) |
| ***H04L 41/0813*** | (2022.01) |
| ***H04L 67/1008*** | (2022.01) |

(52) U.S. Cl.

CPC ...... *H04L 67/1008* (2013.01); *G06F 16/2343* (2019.01); *H04L 41/0813* (2013.01); *H04L 63/08* (2013.01)

(58) Field of Classification Search

CPC . H04L 67/1008; H04L 41/0813; H04L 63/08; G06F 16/2343

See application file for complete search history.

(56) References Cited

U.S. PATENT DOCUMENTS

2010/0106697 A1* 4/2010 Enoki ........................ G06F 9/52 707/704
2023/0342222 A1* 10/2023 Mathew ................ G06F 16/182

OTHER PUBLICATIONS

Kleppmann (How to do distributed locking, published Feb. 8, 2016, https://martin.kleppmann.com/2016/02/08/how-to-do-distributed-locking.html, retrieved Jan. 10, 2026) (Year: 2016).*

* cited by examiner

*Primary Examiner* — Abdulkader M Alriyashi
(74) *Attorney, Agent, or Firm* — James J. DeCarlo; Greenberg Traurig, LLP

(57) ABSTRACT

In some implementations, the techniques described herein relate to a method including: determining whether a distributed lock is available for an operation on a shared resource via a coordination server managing locks across a plurality of application servers in a multi-tenant environment; acquiring the distributed lock when available by generating a fencing token associated with the distributed lock, the fencing token being a monotonically increasing value managed by the coordination server; verifying the fencing token by a given application server prior to performing the operation on the shared resource; invalidating cached data across application servers after performing the operation, wherein cache invalidation is triggered by the given application server that performs the operation; and releasing the distributed lock to the coordination server after the operation, allowing other application servers to acquire the distributed lock.

20 Claims, 11 Drawing Sheets

SYSTEM AND METHOD FOR HORIZONTAL SCALING OF MULTI-TENANT WEB APPLICATIONS

BACKGROUND

Multi-tenant web applications allow multiple customers or tenants to share computing resources while maintaining logical separation of data and functionality. As the number of tenants and users grows, these applications face challenges in scaling to meet increased demand. Horizontal scaling, which involves adding more server instances to distribute load, is a common approach for improving capacity and performance. However, implementing horizontal scaling in multi-tenant environments presents unique technical challenges related to load balancing, session management, caching, and maintaining data consistency across distributed systems.

DETAILED DESCRIPTION

Figure 1:
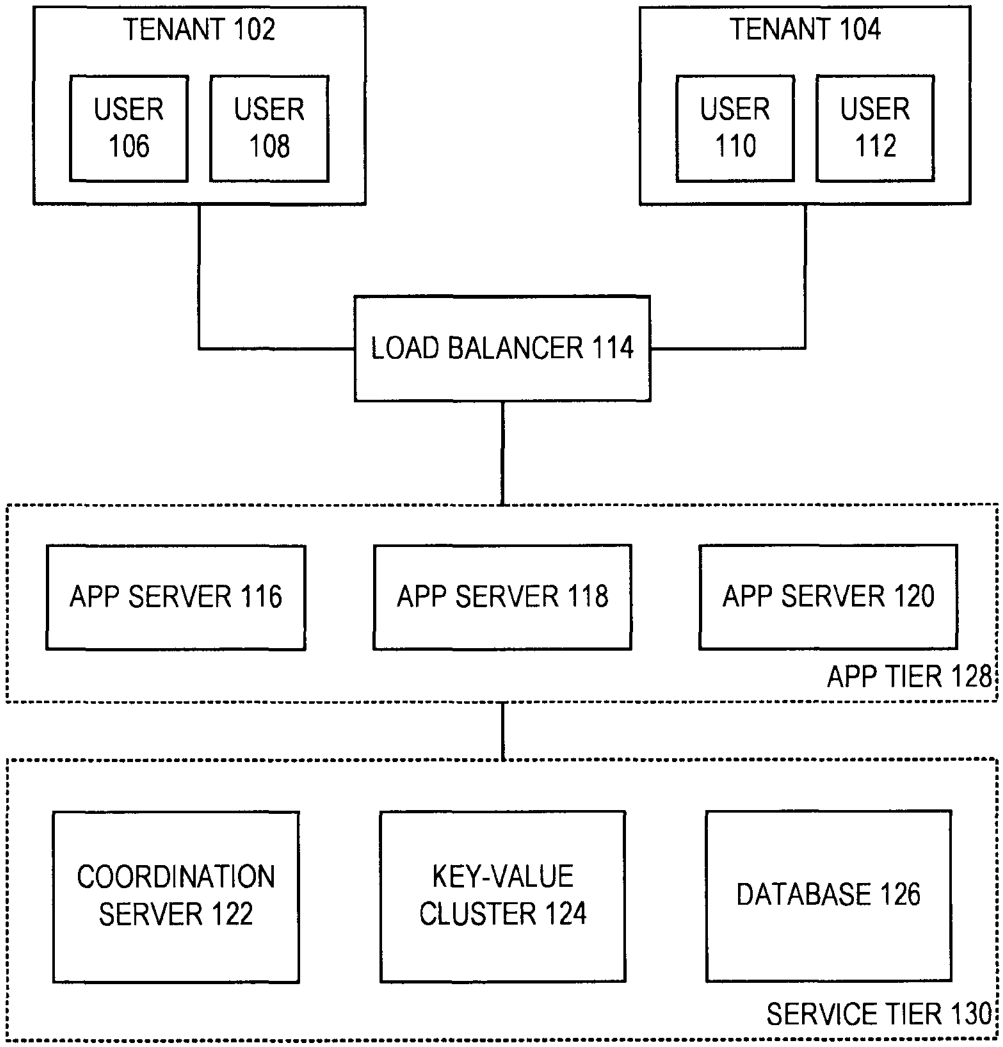
FIG. 1 is a block diagram illustrating a horizontally scaled multi-tenant web application architecture.

Given the above known challenges, it has been recognized that effective solutions must address these challenges while optimizing resource utilization and preserving application functionality. To meet these ends, in some implementations, the techniques described herein relate to a method including: determining whether a distributed lock is available for an operation on a shared resource via a coordination server managing locks across a plurality of application servers in a multi-tenant environment; acquiring the distributed lock when available by generating a fencing token associated with the distributed lock, the fencing token being a monotonically increasing value managed by the coordination server; verifying the fencing token by a given application server prior to performing the operation on the shared resource; invalidating cached data across application servers after performing the operation, wherein cache invalidation is triggered by the given application server that performs the operation; and releasing the distributed lock to the coordination server after the operation, allowing other application servers to acquire the distributed lock.

In some implementations, the techniques described herein relate to a method, further including: detecting a data change in one application server; generating a cache invalidation event associated with the data change; publishing the cache invalidation event to a distributed messaging system; and consuming the cache invalidation event on multiple application servers to invalidate cached data.

In some implementations, the techniques described herein relate to a method, further including: receiving a request to cancel a long-running operation on an application server; identifying the operation associated with the request; publishing a cancellation event to a distributed messaging system; consuming the cancellation event at the application server; and interrupting the long-running operation.

In some implementations, the techniques described herein relate to a method, further including: detecting a failure of an application server; identifying affected user sessions on the application server; retrieving session data from an external session store; and restoring the affected user sessions on an available application server.

In some implementations, the techniques described herein relate to a method, wherein the coordination server implements a hierarchical locking mechanism, wherein locks are applied at different levels of data objects, including individual records, tables, and tenant-specific resources, within the multi-tenant environment.

In some implementations, the techniques described herein relate to a method, further including assigning tenants to specific application servers dynamically, based on a current load and predefined service level agreements, wherein a load balancer adjusts a distribution of tenants in response to changes in resource availability and server performance.

In some implementations, the techniques described herein relate to a method, wherein the fencing token is generated as a monotonically increasing value, wherein the given application server holding the distributed lock presents the fencing token before modifying the shared resource, and a modification is executed only if the fencing token corresponds to a most recent token issued for that lock.

In some implementations, the techniques described herein relate to a non-transitory computer-readable storage medium for tangibly storing computer program instructions capable of being executed by a computer processor, the computer program instructions defining steps of: determining whether a distributed lock is available for an operation on a shared resource via a coordination server managing locks across a plurality of application servers in a multi-tenant environment; acquiring the distributed lock when available by generating a fencing token associated with the distributed lock, the fencing token being a monotonically increasing value managed by the coordination server; verifying the fencing token by a given application server prior to performing the operation on the shared resource; invalidating cached data across application servers after performing the operation, wherein cache invalidation is triggered by the given application server that performs the operation; and releasing the distributed lock to the coordination server after the operation, allowing other application servers to acquire the distributed lock.

In some implementations, the techniques described herein relate to a non-transitory computer-readable storage medium, the steps further including: detecting a data change in one application server; generating a cache invalidation event associated with the data change; publishing the cache invalidation event to a distributed messaging system; and consuming the cache invalidation event on multiple application servers to invalidate cached data.

In some implementations, the techniques described herein relate to a non-transitory computer-readable storage medium, the steps further including: receiving a request to cancel a long-running operation on an application server; identifying the operation associated with the request; publishing a cancellation event to a distributed messaging system; consuming the cancellation event at the application server; and interrupting the long-running operation.

In some implementations, the techniques described herein relate to a non-transitory computer-readable storage medium, the steps further including: detecting a failure of an application server; identifying affected user sessions on the application server; retrieving session data from an external session store; and restoring the affected user sessions on an available application server.

In some implementations, the techniques described herein relate to a non-transitory computer-readable storage medium, wherein the coordination server implements a hierarchical locking mechanism, wherein locks are applied at different levels of data objects, including individual records, tables, and tenant-specific resources, within the multi-tenant environment.

In some implementations, the techniques described herein relate to a non-transitory computer-readable storage medium, the steps further including assigning tenants to specific application servers dynamically, based on a current load and predefined service level agreements, wherein a load balancer adjusts a distribution of tenants in response to changes in resource availability and server performance.

In some implementations, the techniques described herein relate to a non-transitory computer-readable storage medium, wherein the fencing token is generated as a monotonically increasing value, wherein the given application server holding the distributed lock presents the fencing token before modifying the shared resource, and a modification is executed only if the fencing token corresponds to a most recent token issued for that lock.

In some implementations, the techniques described herein relate to a system including: a processor; and a storage medium for tangibly storing thereon program logic for execution by the processor, the program logic including steps for: determining whether a distributed lock is available for an operation on a shared resource via a coordination server managing locks across a plurality of application servers in a multi-tenant environment; acquiring the distributed lock when available by generating a fencing token associated with the distributed lock, the fencing token being a monotonically increasing value managed by the coordination server; verifying the fencing token by a given application server prior to performing the operation on the shared resource; invalidating cached data across application servers after performing the operation, wherein cache invalidation is triggered by the given application server that performs the operation; and releasing the distributed lock to the coordination server after the operation, allowing other application servers to acquire the distributed lock.

In some implementations, the techniques described herein relate to a system, the steps further including: detecting a data change in one application server; generating a cache invalidation event associated with the data change; publishing the cache invalidation event to a distributed messaging system; and consuming the cache invalidation event on multiple application servers to invalidate cached data.

In some implementations, the techniques described herein relate to a system, the steps further including: receiving a request to cancel a long-running operation on an application server; identifying the operation associated with the request; publishing a cancellation event to a distributed messaging system; consuming the cancellation event at the application server; and interrupting the long-running operation.

In some implementations, the techniques described herein relate to a system, the steps further including: detecting a failure of an application server; identifying affected user sessions on the application server; retrieving session data from an external session store; and restoring the affected user sessions on an available application server.

In some implementations, the techniques described herein relate to a system, wherein the coordination server implements a hierarchical locking mechanism, wherein locks are applied at different levels of data objects, including individual records, tables, and tenant-specific resources, within the multi-tenant environment.

In some implementations, the techniques described herein relate to a system, the steps further including assigning tenants to specific application servers dynamically, based on a current load and predefined service level agreements, wherein a load balancer adjusts a distribution of tenants in response to changes in resource availability and server performance.

In some implementations, systems, devices, and computer-readable media for performing the above methods are also described.

FIG. 1 is a block diagram illustrating a horizontally scaled multi-tenant web application architecture. In the illustrated implementation, the system 100 can handle requests from multiple tenants and their respective users while providing scalability, load balancing, and resource optimization, as will be discussed further herein.

System 100 includes two example tenants: tenant 102 and tenant 104. The specific number of tenants is not limited, however. In some implementations, tenants can be separate organizations or customers that utilize the multi-tenant web application. Each tenant may have its own set of users. Tenant 102 includes user 106 and user 108, while tenant 104 includes user 110 and user 112. While only two users are shown for each tenant, in practice, a tenant may have hundreds or thousands of users accessing the system simultaneously. No practical limit is placed on the number of users per tenant.

The requests from these users are directed to a load balancer 114. The load balancer 114 can distribute incoming requests across multiple application servers to ensure optimal resource utilization and prevent any single server from becoming overwhelmed. The load balancer 114 can make routing decisions for each request, discussed later herein.

The system 100 includes an app tier 128, which consists of multiple application servers: app server 116, app server 118, and app server 120. In some implementations, these application servers are identical instances of a web application, capable of handling requests from any tenant or user. The horizontal scaling of these app servers allows the system to handle increased load by adding more server instances as needed, rather than scaling up the resources of a single server. In some implementations, each app server is designed to be stateless, meaning that they don't store user-specific information between requests. In some implementations, this stateless design allows any request to be handled by any available app server, improving flexibility and fault tolerance.

In some implementations, the app servers interact with the service tier 130, which provides backend services required for the functioning of the web application. In some implementations, the service tier 130 includes three components: a coordination server 122, a key-value cluster 124, and a database 126.

In some implementations, the coordination server 122 is responsible for managing distributed locks and coordinating activities across the app servers. In one implementation, the coordination server 122 may be a ZooKeeper$^{TM}$ cluster, which provides a centralized service for maintaining configuration information, naming, providing distributed synchronization, and group services. In some implementations, ZooKeeper may be used for implementing distributed locks. In some implementations, the key-value cluster 124 serves multiple purposes in the architecture. In some implementations, key-value cluster 124 may comprise a Redis™ cluster or similar cluster. In some implementations, the key-value cluster 124 is used for caching frequently accessed data, managing session information, and facilitating communication between app servers for tasks such as cache invalidation. In some implementations, the database 126 is the primary data store for the web application, containing all persistent data for all tenants. It's designed to handle the data storage needs of multiple tenants while maintaining data isolation between them. The database 126 may be implemented using a relational database management system (RDBMS) like PostgreSQL or a NoSQL database, depending on the specific requirements of the application.

In some implementations, the load balancer 114 can use an Exponential Moving Weighted Average (EMWA) algorithm to distribute incoming requests across the available app servers (116, 118, 120). In some implementations, this algorithm takes into account the response times of recent requests to each app server, giving more weight to recent performance data. In some implementations, this approach can evenly distribute load while also adapting quickly to changes in server performance or capacity. In addition to load balancing, the system can provide session affinity, also known as "sticky" sessions. When a user, such as user 106 from tenant 102, makes their first request, the load balancer 114 assigns them to a specific app server (e.g., app server 116). The load balancer then sets a session cookie in the user's browser. For subsequent requests, the load balancer can read this cookie and routes the request to the same app server, ensuring that the user's session data remains consistent. To maintain data consistency across the horizontally scaled environment, the system can implement distributed locking using the coordination server 122. When an app server needs to perform an operation that requires exclusive access to a resource (e.g., updating a shared configuration), it can request a lock from the coordination server 122.

In some implementations, the coordination server 122 manages these locks using ephemeral sequential nodes. In some implementations, when an app server requests a lock, it creates an ephemeral node (which automatically disappears if the server disconnects) with a sequential number. The server with the lowest sequence number acquires the lock. Other servers can watch for changes to determine when it's their turn to acquire the lock. In some implementations, to prevent issues with crashed servers or network partitions, the system implements a fencing token mechanism. When a server acquires a lock, it also receives a monotonically increasing token number. Before performing the protected operation, the server must present this token to the resource being accessed (e.g., the database 126). If a higher token number has already been seen, the operation is rejected, preventing "zombie" processes from corrupting data.

In some implementations, the app servers (116, 118, 120) use local caching to improve performance, which requires keeping caches consistent across all servers. The key-value cluster 124 plays a role in providing for this requirement. When data is updated on any app server, it generates a cache invalidation event. In some implementations, this event is published to a channel in the key-value cluster 124 using a publish-subscribe (pub/sub) mechanism. In some implementations, all app servers subscribe to this channel and receive the invalidation events in real-time. Upon receiving an invalidation event, each app server checks if it has the affected data in its local cache. If so, it invalidates that cache entry, ensuring that the next request for that data will fetch the most up-to-date version from the database 126.

In some implementations, the architecture includes a centralized root dashboard for monitoring and managing the system. In some implementations, this dashboard collects data from all app servers and presents a unified view of the system's state. In some implementations, each app server periodically sends its status information (including active sessions, running operations, and performance metrics) to the key-value cluster 124. In some implementations, the dashboard application can then retrieve this consolidated data from the key-value cluster, providing administrators with a comprehensive view of the entire system.

In some implementations, for managing long-running operations, the system uses the key-value cluster 124 as an event stream. When an administrator needs to cancel a long-running operation, they initiate the request through the dashboard. This generates a cancellation event that is published to an event stream in the key-value cluster 124. All app servers consume events from this stream. When a cancellation event is received, each server checks if the operation is running locally. If so, it interrupts the operation and updates its status. This mechanism allows for centralized control of distributed operations.

In some implementations, the architecture incorporates a distributed job scheduling system, implemented using a Quartz scheduler (described further herein). In some implementations, each app server can run its own instance of the Quartz scheduler, but they are configured to work as a cluster. In some implementations, the Quartz schedulers use the database 126 for job storage and coordination. This allows jobs to be distributed across the cluster, providing fault tolerance and load distribution for background tasks. If one app server fails, its scheduled jobs can be picked up and executed by other servers in the cluster.

To improve user experience in case of server failures, the system 100 can implement end-user session recovery. Session data is stored in the key-value cluster 124 rather than in the memory of individual app servers. If an app server fails, the load balancer 114 can redirect the user's subsequent requests to a different app server. This new server can retrieve the session data from the key-value cluster 124, allowing the user to continue their work without losing their session state or being forced to log in again.

In some implementations, tenants can be grouped and assigned to specific sets of app servers based on their needs and service level agreements. For example, high-priority tenants (like tenant 102) might be assigned to a group of app servers with more resources or lower user-to-server ratios. Lower-priority tenants (like tenant 104) might share a larger pool of servers to optimize resource utilization. The system can dynamically adjust these assignments based on usage patterns, allowing for efficient scaling. If a tenant experiences increased demand, additional app servers can be provisioned and added to their assigned group. Conversely, underutilized servers can be reallocated or decommissioned to reduce costs.

While the app servers are shared across tenants, the system can maintain strict data isolation at the database level. In some implementations, the database 126 is designed with a multi-tenant schema, where each tenant's data is logically separated. When processing a request, the app servers use the tenant information to ensure they only access the appropriate data for that tenant. This might involve using separate database schemas for each tenant or incorporating tenant IDs into all database queries. In some implementations, the architecture includes comprehensive observability features. Each component, including the app servers, load balancer, and services in the service tier, emits detailed logs and metrics. These logs and metrics are collected and stored in a centralized system (not shown in the diagram) for analysis and monitoring. This allows administrators to track system health, identify performance bottlenecks, and detect anomalies across the entire distributed system.

Figure 2:
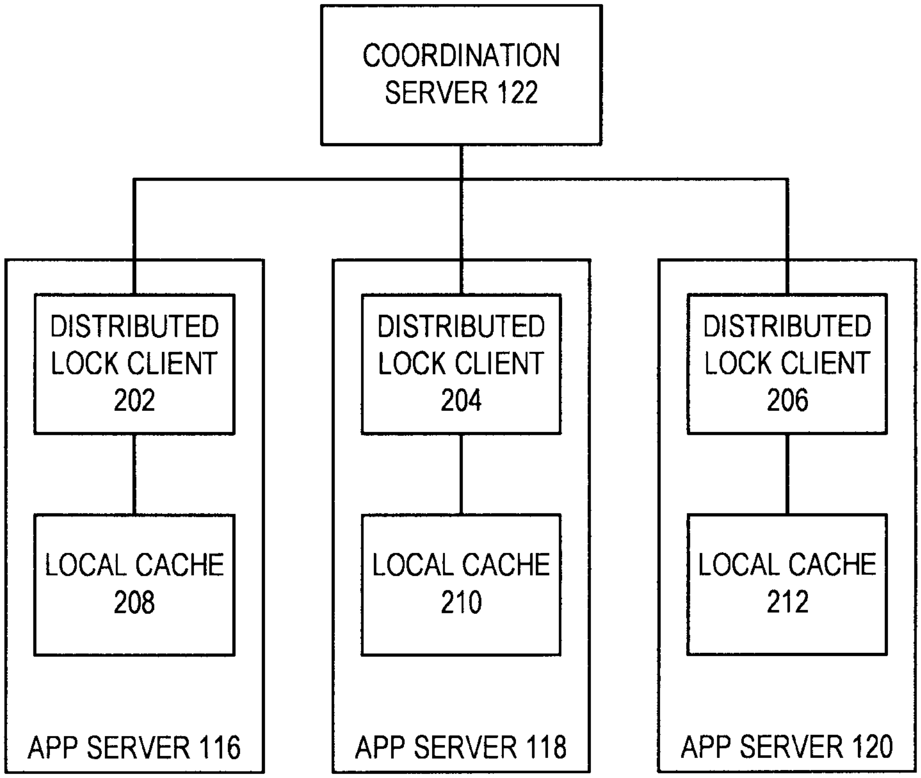
FIG. 2 is a block diagram illustrating a distributed locking system.

FIG. 2 is a block diagram illustrating a distributed locking system. In some implementations, this system is designed to maintain data consistency and coordinate access to shared resources across multiple application servers in a distributed environment.

In some implementations, coordination server 122 serves as the central authority for managing distributed locks. The coordination server 122 is typically implemented using a technology like Apache ZooKeeper, which is specifically designed for maintaining configuration information, providing distributed synchronization, and offering group services.

Connected to the coordination server 122 are three application servers: app server 116, app server 118, and app server 120. These app servers correspond to the same app servers shown in FIG. 1, but FIG. 2 provides a more detailed view of their internal components related to the distributed locking system.

Each app server contains two illustrated components: a distributed lock client and a local cache. Specifically, as illustrated, app server 116 includes distributed lock client 202 and local cache 208. Similarly, app server 118 has distributed lock client 204 and local cache 210, while app server 120 contains distributed lock client 206 and local cache 212.

The distributed lock clients (202, 204, 206) are responsible for interacting with the coordination server 122 to acquire, release, and manage locks on behalf of their respective app servers. These clients implement the necessary protocols to communicate with the coordination server and handle the complexities of distributed lock acquisition and release.

In some implementations, when an app server needs to perform an operation that requires exclusive access to a shared resource, its distributed lock client initiates the lock acquisition process. This process typically involves creating an ephemeral sequential node in, for example, a ZooKeeper hierarchy. The use of ephemeral nodes ensures that if an app server crashes or becomes disconnected, its locks will be automatically released, preventing indefinite resource locking.

In some implementations, the sequential nature of the nodes creates an implicit queue for lock requests. Each distributed lock client can observe the ZooKeeper hierarchy to determine its position in the queue. The client with the lowest sequence number is granted the lock, while others wait for their turn. This approach ensures fairness in lock acquisition and prevents starvation of lock requests.

In some implementations, to improve performance and reduce the load on the coordination server 122, the distributed lock clients can implement watch mechanisms. Instead of continuously polling for lock availability, a client sets a watch on the node immediately preceding its own in the sequence. When that node is deleted (indicating the lock has been released), the watching client is notified and can then acquire the lock. This event-driven approach can significantly reduce network traffic and coordination server load compared to a polling-based system.

The local caches (208) in each app server can optimize performance and reduce the frequency of lock acquisitions. These caches store frequently accessed data or computation results locally within each app server. By maintaining a local cache, an app server can often serve requests without needing to acquire a distributed lock and access shared resources.

However, the use of local caches introduces the challenge of cache consistency across multiple app servers. To address this, the distributed locking system can incorporate cache invalidation mechanisms. When an app server acquires a lock and modifies shared data, it not only updates the authoritative data store (e.g., the database 126 shown in FIG. 1) but also triggers a cache invalidation event.

This cache invalidation event is propagated to all app servers, typically through the key-value cluster 124 (shown in FIG. 1) using a publish-subscribe mechanism. Upon receiving a cache invalidation event, each app server's local cache (208) invalidates the corresponding entries. This ensures that subsequent requests will fetch the most up-to-date data, maintaining consistency across the distributed system.

The distributed locking system also implements a fencing token mechanism to prevent the "split-brain" problem that can occur in distributed systems. When a distributed lock client successfully acquires a lock from the coordination server 122, it receives a monotonically increasing token number along with the lock grant. Before performing the protected operation, the app server must present this token to the resource being accessed (e.g., the database or another shared service).

The resource keeps track of the highest token number it has seen for each lock. If an app server presents a token number lower than the highest seen, the operation is rejected. This mechanism prevents scenarios where an app server believes it still holds a valid lock (perhaps due to network issues or long garbage collection pauses) but has actually lost it, ensuring that only the true lock holder can modify shared resources.

To handle scenarios where an app server holding a lock crashes or becomes unresponsive, the system implements lock timeouts. If a lock is held for longer than a predefined timeout period, the coordination server 122 can forcibly release the lock, allowing other app servers to acquire it. This prevents indefinite resource locking due to server failures.

The distributed lock clients (202, 204, 206) also implement retry and backoff mechanisms for lock acquisition. If a lock acquisition fails due to contention, the client will wait for a short period before retrying. To prevent "thundering herd" problems where multiple clients repeatedly contend for the same lock, exponential backoff can be employed, increasing the wait time between retry attempts.

For operations that require read-only access to shared resources, the system can implement read locks. Multiple app servers can hold read locks simultaneously, allowing for increased concurrency for read-heavy workloads. However, when an app server requests a write lock, it must wait for all read locks to be released before it can acquire exclusive access.

The coordination server 122 can maintain a hierarchical namespace for locks, allowing for fine-grained locking at various levels of the application's data model. For example, there might be locks for individual records, entire tables, or global application-wide locks. This hierarchical structure allows the system to minimize lock contention by using the most specific lock necessary for each operation.

To improve system resilience, the coordination server 122 is typically deployed as a cluster of multiple nodes. This ensures that the distributed locking system can continue to function even if some coordination server nodes fail. The ZooKeeper implementation can use a quorum-based approach, where as long as a majority of nodes are operational, the system can continue to provide consistent lock management services.

The distributed locking system also provides mechanisms for lock downgrading and upgrading. An app server holding a write lock may downgrade it to a read lock if it no longer needs exclusive access. Conversely, an app server may attempt to upgrade a read lock to a write lock, though this operation may need to wait for other read locks to be released.

To prevent deadlocks, the system implements lock acquisition timeouts. If an app server cannot acquire a lock within a specified time limit, it releases any locks it already holds and aborts the operation. This ensures that the system can recover from scenarios where multiple app servers are waiting for locks held by each other (i.e. a deadlock).

The distributed lock clients (202, 204, 206) also implement lock reentry, allowing an app server that already holds a lock to reacquire the same lock without blocking. This is useful for recursive algorithms or nested operations that may require the same lock at different levels of execution. In some implementations, each distributed lock client logs lock acquisitions, releases, and any errors encountered. These logs are aggregated and analyzed to identify patterns of lock contention, potential performance bottlenecks, or anomalies in lock usage.

Figure 3:
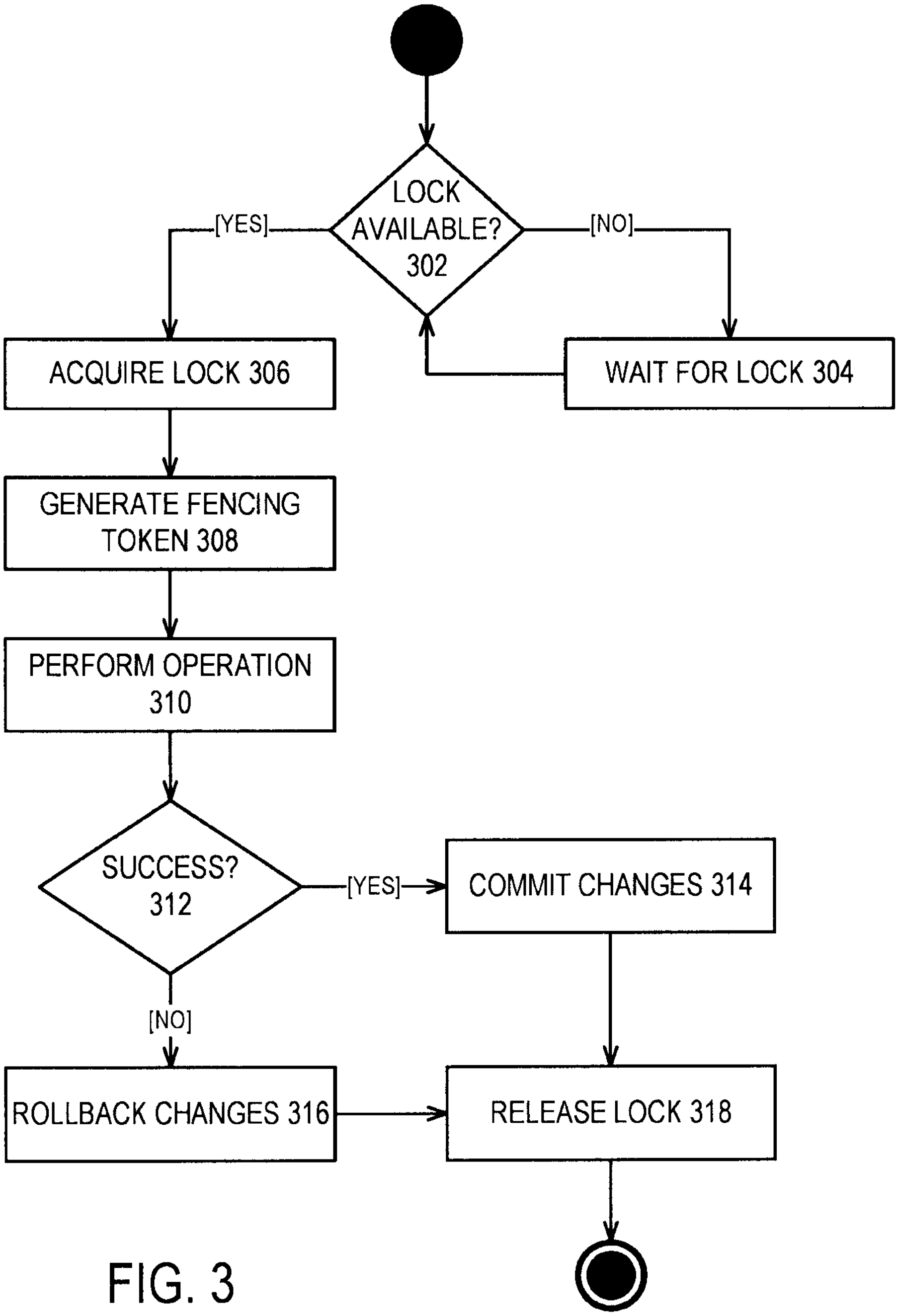
FIG. 3 is a flow diagram illustrating a method for implementing fencing tokens in a distributed locking system.

FIG. 3 is a flow diagram illustrating a method for implementing fencing tokens in a distributed locking system.

In step 302, the method can include determining whether a lock is available.

In some implementations, this step involves querying the coordination server (e.g., coordination server 122 in FIG. 2) to check the availability of the desired lock. The distributed lock client (e.g., distributed lock client 202, 204, or 206 in FIG. 2) sends a request to the coordination server, which maintains the current state of all locks in the system. The coordination server checks its internal data structures, typically implemented as a hierarchical namespace, to determine if the requested lock is currently held by another client or if it's available for acquisition.

In step 304, the method can include waiting for the lock if it is not available.

If the lock is currently held by another client, the distributed lock client enters a wait state. Instead of continuously polling the coordination server, which would be inefficient and create unnecessary network traffic, the client typically sets a watch on the lock's corresponding node in the coordination server's hierarchy. This watch mechanism allows the client to be notified asynchronously when the lock becomes available. The client may implement an exponential backoff strategy to avoid overwhelming the coordination server with repeated lock acquisition attempts. During this wait period, the client may also check for a timeout condition to prevent indefinite waiting, which could lead to application-level deadlocks.

In step 306, the method can include acquiring the lock when it becomes available.

Once the lock is available, either immediately or after waiting, the distributed lock client proceeds to acquire it. This process typically involves creating an ephemeral sequential node in the coordination server's hierarchy. The ephemeral nature ensures that if the client crashes or loses connection, the lock will be automatically released. The sequential aspect creates an ordered queue of lock requests, ensuring fairness in lock acquisition. The client with the lowest sequence number in the queue acquires the lock. Upon successful acquisition, the coordination server updates its internal state to reflect that the lock is now held by this client.

In step 308, the method can include generating a fencing token.

After successfully acquiring the lock, the method generates a fencing token. This token is a monotonically increasing number associated with each lock acquisition. The coordination server is responsible for generating and managing these tokens, ensuring that each new token is greater than any previously issued token for the same lock. The fencing token serves as a logical timestamp, allowing the method to detect and prevent "zombie" processes or delayed operations from corrupting shared resources.

In step 310, the method can include performing the operation protected by the lock.

With the lock acquired and the fencing token generated, the client can now proceed to perform the operation that required exclusive access. This operation could involve updating shared data in a database, modifying configuration settings, or any other section that requires mutual exclusion. Before executing the operation, the client presents the fencing token to the resource being accessed (e.g., a database or another shared service). The resource compares this token against the highest token it has seen for this particular lock. If the presented token is lower than the highest seen, the operation is rejected, preventing potential data corruption from out-of-order or "zombie" processes.

In step 312, the method can include determining whether the operation was successful.

After performing the protected operation, the method evaluates its outcome. This evaluation may involve checking return codes, verifying that all expected changes were applied, or running validation logic to ensure the operation's results meet expected criteria. The success or failure of the operation determines the subsequent flow of the method.

In step 314, the method can include committing changes if the operation was successful.

If the operation is deemed successful, the method proceeds to commit the changes. This step may involve finalizing database transactions, updating cache entries, or persisting modified configuration settings. The commit process ensures that all changes made during the protected operation are durably stored and become visible to other parts of the system. In some implementations, the commit operation itself is atomic to maintain data consistency. During this step, the method may also trigger cache invalidation events to notify other application servers that relevant data has been modified, prompting them to refresh their local caches.

In step 316, the method can include rolling back changes if the operation was not successful.

If the operation fails for any reason, the method initiates a rollback process. This involves reverting any partial changes made during the operation to restore the system to its state prior to the lock acquisition. The rollback process may include aborting database transactions, restoring previous values in the cache, or reverting configuration changes. It's essential that the rollback operation is comprehensive and leaves no trace of the failed operation to maintain data integrity and consistency across the distributed system.

In step 318, the method can include releasing the lock.

Regardless of whether the operation was successful and changes were committed, or it failed and changes were rolled back, the final step is to release the lock. This can involve the distributed lock client sending a request to the coordination server to remove its lock ownership. In the case of ZooKeeper implementation, this typically means deleting the ephemeral node that represents the lock. Releasing the lock allows other clients that may be waiting to acquire it and proceed with their operations. In some implementations, lock release is performed reliably to prevent lock leaks, which could lead to deadlocks in the system.

After releasing the lock, the method reaches its end node, completing the lock-protected operation cycle.

Figure 4:
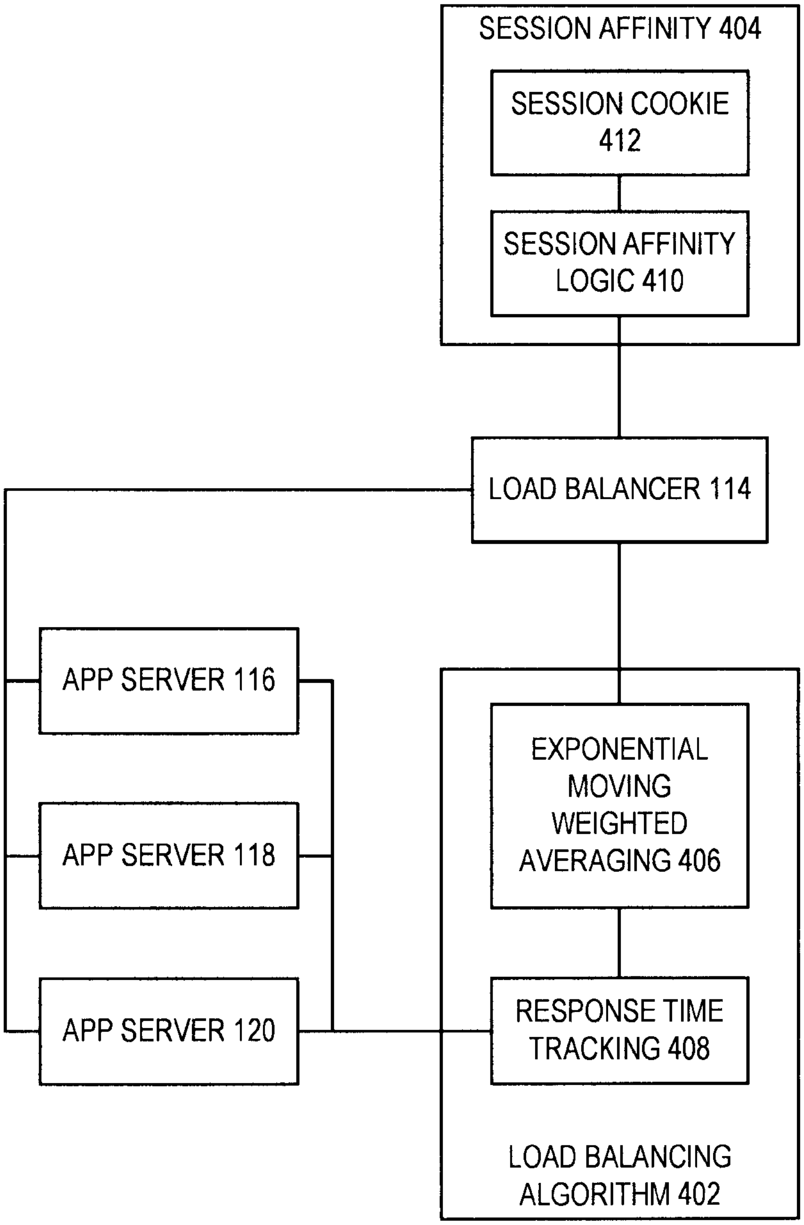
FIG. 4 is a block diagram illustrating a load balancing and session affinity system.

FIG. 4 is a block diagram illustrating a load balancing and session affinity system. This system is designed to efficiently distribute incoming requests across multiple application servers while maintaining session consistency for users.

The system includes load balancer 114, which serves as the entry point for all incoming requests to the web application. The load balancer 114 is responsible for routing requests to the appropriate app server based on various factors, including server load, response times, and session affinity. Connected to the load balancer 114 are three components: the session affinity module 404, the load balancing algorithm 402, and the app servers (116, 118, 120).

The session affinity module 404 is composed of two sub-components: the session cookie 412 and the session affinity logic 410. These components work together to ensure that requests from a single user session are consistently routed to the same app server throughout the duration of the session.

The session cookie 412 is a small piece of data stored on the client's browser. It typically contains a unique identifier for the user's session and may include additional metadata such as the ID of the app server handling the session. When a user first interacts with the web application, the load balancer 114 generates this cookie and sends it back to the client along with the response to the initial request.

The session affinity logic 410 is responsible for interpreting the session cookie and making routing decisions based on its content. When a request arrives at the load balancer 114, the session affinity logic 410 examines the session cookie (if present) to determine if the request belongs to an existing session. If it does, the logic attempts to route the request to the same app server that handled previous requests for this session.

The load balancing algorithm 402 is responsible for distributing requests across the available app servers when session affinity is not applicable or when new sessions are being created. It consists of two components: the exponential moving weighted averaging 406 and the response time tracking 408.

The exponential moving weighted averaging (EMWA) 406 is an algorithm that calculates a weighted average of server response times, giving more weight to recent measurements. This approach allows the load balancer to adapt quickly to changes in server performance or capacity. The EMWA 406 continuously updates its calculations based on the latest response time data, providing a dynamic and responsive measure of each server's current performance.

The response time tracking 408 component is responsible for measuring and recording the response times of requests sent to each app server. It collects data on how long each server takes to process requests, which is then fed into the EMWA 406 calculations. This tracking may include various metrics such as time to first byte, total request processing time, and potentially even application-specific performance indicators.

The load balancing algorithm 402 uses the output from the EMWA 406 and response time tracking 408 to make intelligent decisions about request routing. When a new session needs to be assigned to an app server, or when session affinity cannot be maintained (e.g., due to server failures), the algorithm selects the most appropriate server based on current performance metrics.

The app servers (116, 118, 120) represent the actual instances of the web application that process user requests. These servers are identical in capability, allowing any server to handle requests from any user or tenant. The horizontal scaling of these app servers allows the system to increase capacity by adding more instances as demand grows.

In some implementations, when a new request arrives at the load balancer 114, it first checks for the presence of a session cookie 412. If no cookie is present, this indicates a new session, and the load balancer needs to select an app server to handle the request.

In this case, the load balancing algorithm 402 accesses the current EMWA 406 calculations and recent response time data from the response time tracking 408 component. Based on this information, it selects the app server that is currently performing best or has the most available capacity. This might be the server with the lowest average response time or the one with the least number of active connections, depending on the specific implementation of the algorithm.

Once an app server is selected, the load balancer 114 forwards the request to that server. The selected app server processes the request and generates a response. As part of this response, it also generates a new session cookie 412 containing a unique session identifier and potentially the ID of the app server handling the session.

The load balancer 114 sends this response, including the new session cookie, back to the client. The client's browser stores this cookie and will include it in all subsequent requests to the web application.

For subsequent requests from the same client, the process is slightly different. When these requests arrive at the load balancer 114, they include the session cookie 412 previously set. The session affinity logic 410 examines this cookie to determine which app server should handle the request.

If the app server specified in the cookie is available and healthy, the load balancer 114 routes the request to that server, maintaining session affinity. This ensures that all requests for a given session are handled by the same app server, which allows for stateful sessions and optimizing performance through server-side caching.

However, the system also needs to handle scenarios where strict session affinity cannot be maintained. For example, if the original app server for a session becomes unavailable due to failure or maintenance, the load balancer 114 needs to select a new server to handle the request.

In such cases, the session affinity logic 410 works in conjunction with the load balancing algorithm 402 to select the best alternative server. The algorithm considers the current performance metrics of available servers to make this decision. Once a new server is selected, the session cookie 412 is updated with the new server information, and subsequent requests for this session will be routed to the new server.

The response time tracking 408 component continuously monitors the performance of each app server. It measures how long each server takes to respond to requests and may also track other performance metrics such as error rates or resource utilization. This data is fed into the EMWA 406 calculations, which update the weighted averages used by the load balancing algorithm 402.

The EMWA 406 gives more weight to recent measurements, allowing the system to quickly adapt to changes in server performance. For example, if an app server starts to slow down due to increased load or a resource constraint, its weighted average response time will increase, making it less likely to be selected for new sessions or as a failover option for existing sessions.

This adaptive approach ensures that the load balancing decisions remain optimal even as conditions in the system change. It can help prevent overloading of specific servers and can quickly route traffic away from servers that are experiencing issues.

The load balancing and session affinity system 400 also needs to handle scenarios where a server might become temporarily unavailable, such as during rolling updates or minor network issues. In these cases, the system might implement a grace period during which it will attempt to maintain session affinity even if the preferred server is not immediately responsive. This can help prevent unnecessary session migrations for short-term issues.

Additionally, the system may implement health checks on the app servers. These health checks can be active (where the load balancer periodically sends requests to each server to verify its status) or passive (where the load balancer monitors the success of real user requests). Servers that fail health checks can be temporarily removed from the pool of available servers, ensuring that requests are only routed to healthy instances.

Figure 5:
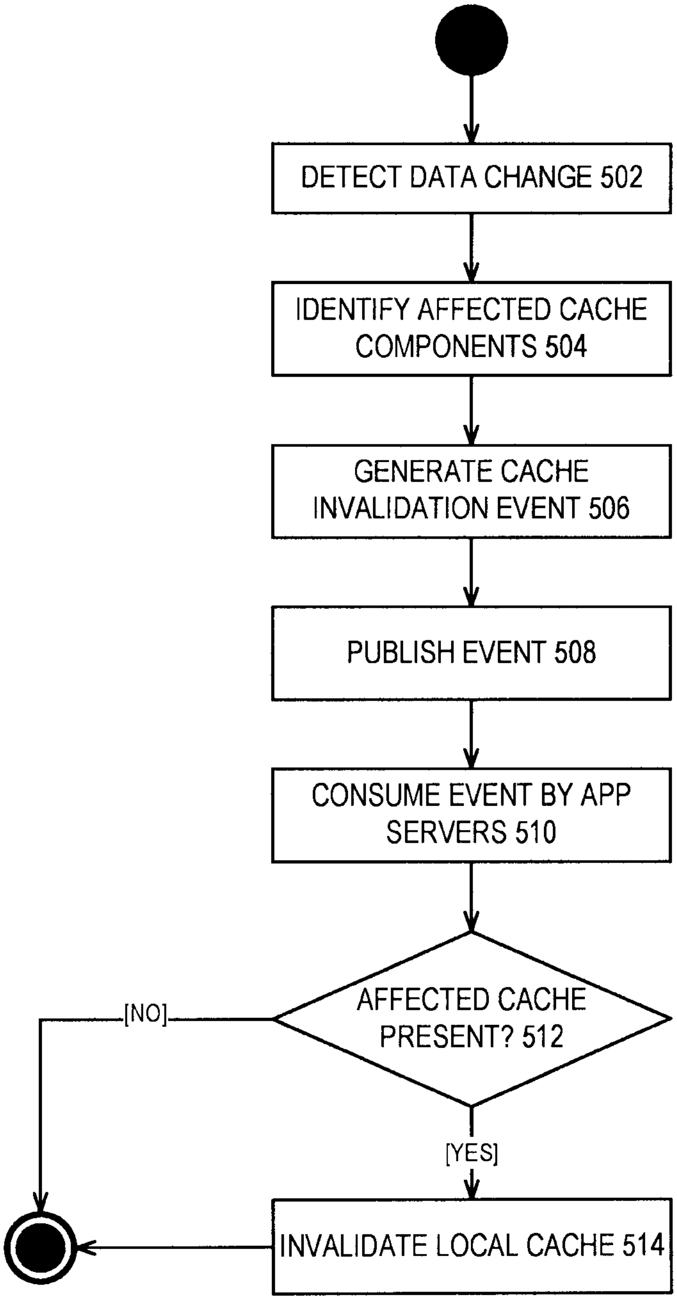
FIG. 5 is a flow diagram illustrating a method for cache invalidation across multiple application servers.

FIG. 5 is a flow diagram illustrating a method for cache invalidation across multiple application servers. This method ensures that all app servers maintain consistent cache states when data changes occur, preventing the serving of stale or incorrect data to users.

In step 502, the method can include detecting a data change.

This step involves identifying when a modification has been made to data that may be cached across multiple app servers. Data changes can occur through various operations, such as user updates, system processes, or batch jobs. The detection mechanism may be implemented at different layers of the application, including database triggers, application logic, or middleware components. For example, when a user updates a record in the database, the application layer handling this update would recognize it as a data change event. In more complex scenarios, the method might use change data capture techniques to monitor database logs for modifications. In some implementations, this detection is reliable and timely to ensure that cache invalidation occurs promptly after data changes.

In step 504, the method can include identifying affected cache components.

Once a data change is detected, the method must determine which specific cache components are impacted by this change. Cache components typically correspond to different types of data or application features, such as user profiles, product catalogs, or configuration settings. This step requires a deep understanding of the application's data model and how different pieces of data relate to each other. The method may use a mapping or registry that associates data entities with their corresponding cache components. For instance, if a user's address is updated, the method would identify that the user profile cache component needs to be invalidated. In more complex cases, a single data change might affect multiple cache components. For example, updating a product's price might require invalidating caches for the product details, search results, and recommendation engines.

In step 506, the method can include generating a cache invalidation event.

After identifying the affected cache components, the method generates a cache invalidation event. This event is a structured message that contains information about which cache components need to be invalidated and potentially additional metadata about the change. The event might include details such as the type of data that changed, the specific records or entities affected, and a timestamp of when the change occurred. The structure of this event can contain sufficient information for all app servers to accurately identify and invalidate the correct cache entries. The event generation process should be efficient to minimize the delay between the data change and the eventual cache invalidation across all servers.

In step 508, the method can include publishing the event.

The generated cache invalidation event is published to a messaging system that can distribute the event to all app servers in the cluster. This step typically involves sending the event to a publish-subscribe (pub/sub) system, such as Redis™ or Apache Kafka™. The pub/sub system acts as an intermediary, decoupling the event producer (the server where the data change occurred) from the consumers (all other app servers that need to invalidate their caches). This decoupling enables scalability and reliability, as it allows servers to join or leave the cluster without affecting the event distribution mechanism. The publishing process can be fault-tolerant, using techniques like at-least-once delivery semantics to ensure that all servers receive the invalidation event even in the face of network issues or server failures.

In step 510, the method can include consuming the event by app servers.

Each app server in the cluster subscribes to the cache invalidation event channel and consumes the published events. This consumption process runs continuously in the background on each server. When an event is received, the app server's event handler parses the event data to extract information about which cache components need to be invalidated. The consumption process should be designed to handle high volumes of events efficiently, potentially using batching techniques to process multiple events at once. It's also important that the event consumption is resilient to failures, implementing retry mechanisms and maintaining a record of successfully processed events to prevent duplicate processing.

In step 512, the method can include determining if the affected cache is present.

For each consumed event, the app server checks if it currently has the affected cache components in its local cache. This step can be included as not all servers may have all cache components loaded at any given time. The check involves querying the local cache storage system, which could be an in-memory data structure, a local disk-based cache, or a combination of both. Techniques such as bloom filters can be used to quickly determine if a cache key might exist without having to perform a full lookup.

In step 514, the method can include invalidating the local cache.

If the affected cache component is present in the local cache, the server proceeds to invalidate it. Invalidation can take different forms depending on the caching strategy employed. One approach is to completely remove the affected cache entries. This ensures that the next request for this data will fetch the most up-to-date version from the authoritative data source (usually a database). Instead of removing the cache entry, the server might mark it as "stale" and set an expiration time. This allows the stale data to be used for a short period while a fresh copy is being fetched, which can help reduce load on the backend systems during high-traffic periods. In some cases, it might be possible to update only the specific fields or portions of a cache entry that have changed, rather than invalidating the entire entry. This can be more efficient but requires careful implementation to ensure consistency. Each cache entry might be associated with a version number. The invalidation process updates this version number, and subsequent reads check if their cached version matches the current version before using the cached data.

Current cache implementations can face challenges with object size and hit rates. For example, some cached report objects can reach sizes of 64 MB, with hit rates around 50%. Ideally, cached objects should be frequently used with hit rates closer to 80%. In some implementations, the method can reduce the size of cached objects or moving towards a distributed caching solution using Redis™ or other cache management solution, which can reduce memory requirements for individual app servers and allow for increased scaling without proportional cost increases The invalidation process can be implemented as an atomic process to prevent race conditions where a cache entry is read while still in the process of being invalidated. After invalidation, the server might also trigger a background process to pre-fetch and re-populate the invalidated cache entries, especially for frequently accessed data.

Figure 6:
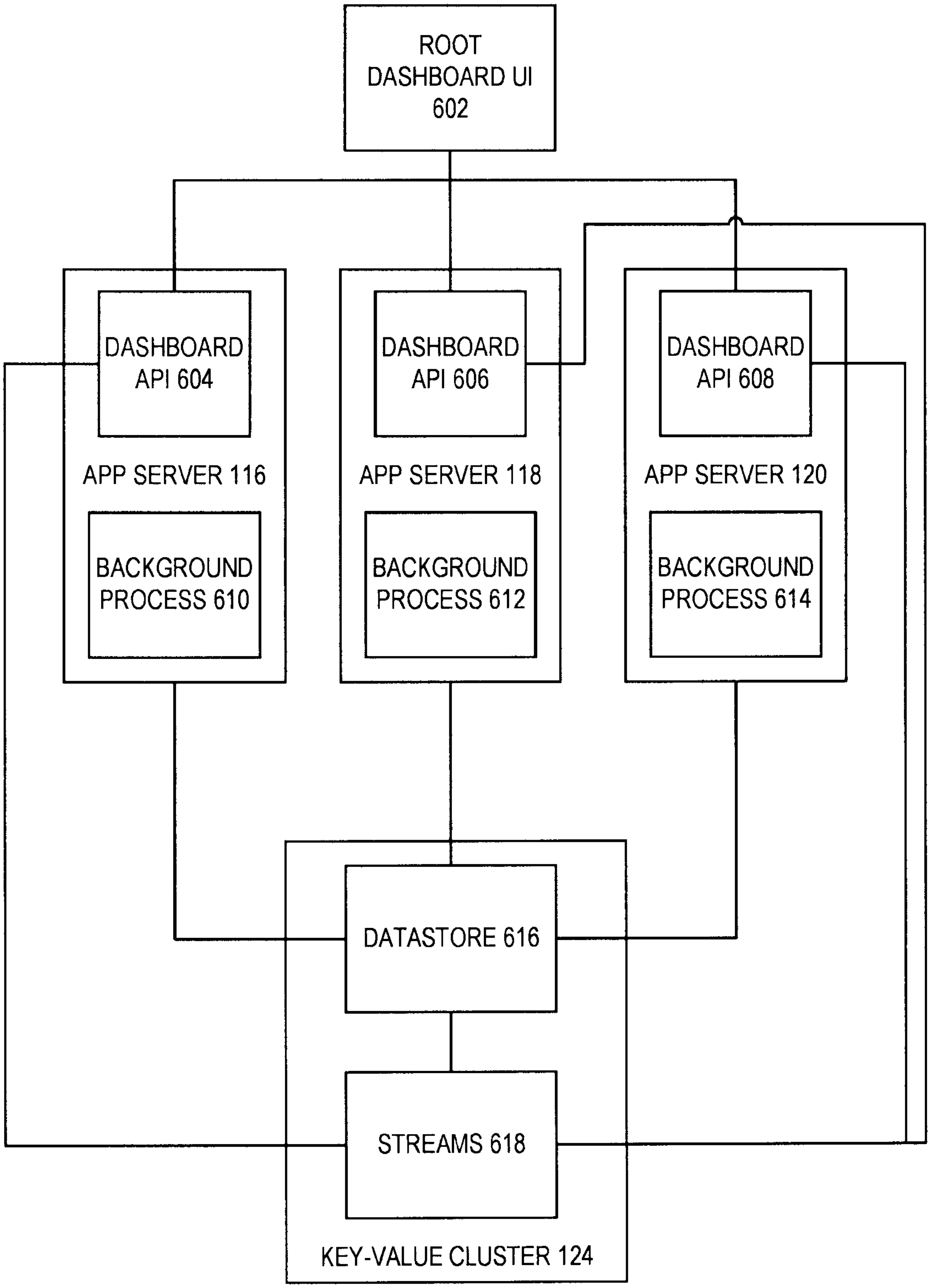
FIG. 6 is a block diagram illustrating a centralized root dashboard system.

In an alternative embodiment, Kafka™ (or other suitable solution with the same or similar functionality) may be used instead of Redis™ for cache invalidation. A Kafka™Event-Service can be created to post and consume events from Kafka™ topics. Kafka™EventsProducer would be used to send events to Kafka™ topics, while Kafka™EventsConsumer would listen on topics and consume events in each app server instance. This approach allows for separation of concerns and potential future use by other planning applications FIG. 6 is a block diagram illustrating a centralized root dashboard system. This system provides a unified interface for monitoring and managing multiple application servers, offering administrators a comprehensive view of the entire system's state and performance.

The system includes a root dashboard UI 602, which serves as the primary interface for administrators to interact with the system. This user interface is designed to aggregate and display information from all connected app servers, presenting a cohesive view of the entire application ecosystem. The root dashboard UI 602 may include various sections for different types of information, such as active user sessions, running operations, system health metrics, and configuration settings.

Connected to the root dashboard UI 602 are multiple app servers, app server 116, app server 118, and app server 120. These app servers correspond to the same servers shown in previous figures and represent the distributed nature of the web application architecture. Each app server contains two components related to the root dashboard system: a dashboard API and a background process.

The dashboard APIs (604, 606, 608) are responsible for exposing relevant data and functionalities from each app server to the root dashboard UI 602. These APIs provide a standardized interface for retrieving information about the server's state, active sessions, running operations, and other pertinent data. They also allow the root dashboard to send commands or make configuration changes to individual app servers.

The dashboard API 604 in app server 116, dashboard API 606 in app server 118, and dashboard API 608 in app server 120 all implement the same interface, ensuring consistency across the system. This uniformity allows the root dashboard UI 602 to interact with any app server in the same manner, regardless of its specific instance or location within the cluster.

The background processes (610, 612, 614) run continuously on each app server, collecting and processing data to be made available through the dashboard APIs. Background process 610 on app server 116, background process 612 on app server 118, and background process 614 on app server 120 perform similar functions, tailored to their respective servers.

These background processes are responsible for tasks such as monitoring system resources (CPU usage, memory consumption, disk I/O, etc.), tracking active user sessions and their associated metadata, logging and aggregating information about running operations, collecting performance metrics for various application components, and detecting and reporting on potential issues or anomalies.

The background processes operate asynchronously, ensuring that data collection and processing do not interfere with the app servers'primary function of handling user requests. They may employ techniques such as sampling, aggregation, and incremental updates to minimize their impact on server performance while still providing timely and accurate data to the dashboard system.

In some implementations, the system further includes a key-value cluster 124, which plays a central role in the root dashboard system. This cluster, implemented using a technology like Redis™, serves as both a data store and a communication mechanism for the dashboard components.

Within the key-value cluster 124, there are two components: the datastore 616 and the streams 618.

The datastore 616 acts as a centralized repository for dashboard-related data collected from all app servers. This component stores aggregated metrics, session information, and other relevant data in a format that can be quickly retrieved and displayed by the root dashboard UI 602. The use of a key-value store allows for fast read and write operations, which is used for maintaining real-time or near-real-time updates in the dashboard.

The datastore 616 may employ various data structures and patterns to efficiently store and retrieve different types of information. It can use hash structures for storing metadata about active sessions or running operations, sorted sets for maintaining ordered lists of metrics or events, strings for simple key-value pairs representing configuration settings or status flags, and lists for time-series data or logs.

The streams 618 component provides a publish-subscribe (pub/sub) mechanism for real-time communication between app servers and the root dashboard UI. This allows for immediate propagation of important events or state changes across the system. The streams 618 can be used for various purposes within the root dashboard system, such as broadcasting system-wide alerts or notifications, propagating configuration changes to all app servers, signaling the start or completion of long-running operations, and notifying the dashboard of sudden spikes in traffic or resource usage.

In some implementations, the background processes (610, 612, 614) on each app server continuously collect data about their respective server's state, performance, and active operations. This data is periodically sent to the datastore 616 in the key-value cluster 124. The data is structured and keyed in a way that allows for efficient retrieval and aggregation across all servers. For example, active session data might be stored with keys that include both the server identifier and the session ID, allowing the dashboard to easily retrieve all active sessions across the entire system or filter for sessions on a specific server.

When significant events occur on an app server (such as the start of a long-running operation or a sudden resource spike), the background process can publish this information to the streams 618. The root dashboard UI 602 subscribes to these streams, allowing it to receive and display real-time updates without constantly polling the app servers or the datastore.

When an administrator accesses the root dashboard UI 602, it queries the datastore 616 to retrieve the most recent aggregated data from all app servers. This might include overall system metrics, lists of active sessions, and summaries of running operations. The dashboard UI can then process and visualize this data, providing administrators with a comprehensive view of the system's state.

If an administrator needs more detailed information about a specific app server, the root dashboard UI 602 can make direct API calls to the relevant dashboard API (604, 606, or 608). This allows for on-demand retrieval of more granular or real-time data that may not be continuously aggregated in the central datastore.

When an administrator needs to perform an action, such as canceling a long-running operation or modifying a configuration setting, the root dashboard UI 602 can send commands through the appropriate dashboard API. For system-wide changes, the dashboard might publish a command to the streams 618, which all app servers are subscribed to, ensuring the change is propagated across the entire cluster simultaneously.

The datastore 616 can also maintain historical data, allowing the root dashboard UI 602 to display trends over time. This might involve storing periodic snapshots of system metrics or maintaining rolling averages. The background processes can be responsible for aggregating and summarizing this historical data to prevent the datastore from growing unbounded.

The use of the key-value cluster 124 as a central point for data storage and communication helps ensure consistency across the dashboard system. If an app server becomes unavailable, its last known state remains in the datastore 616, and the dashboard can clearly indicate which servers are currently active or experiencing issues.

As new app servers are added to the cluster, they can integrate into the dashboard system by implementing the standard dashboard API and background process. The new server begins publishing its data to the same key-value cluster 124, and it automatically becomes visible in the root dashboard UI 602.

The dashboard APIs (604, 606, 608) implement authentication and authorization mechanisms to ensure that only authorized administrators can access sensitive information or perform management actions. This security layer is important in a multi-tenant environment where strict data isolation must be maintained.

The modular nature of the system, with standardized APIs and a central data store, allows for easy extension of the dashboard's capabilities. New types of metrics or management functions can be added by updating the background processes, extending the API, and modifying the data storage schema, without requiring a complete overhaul of the system.

In some implementations, the system may include merging app server endpoints to create a more stateless architecture. This allows users from any customer to be routed to any available app server, increasing concurrency and scalability while potentially reducing the number of clusters needed.

Figure 7:
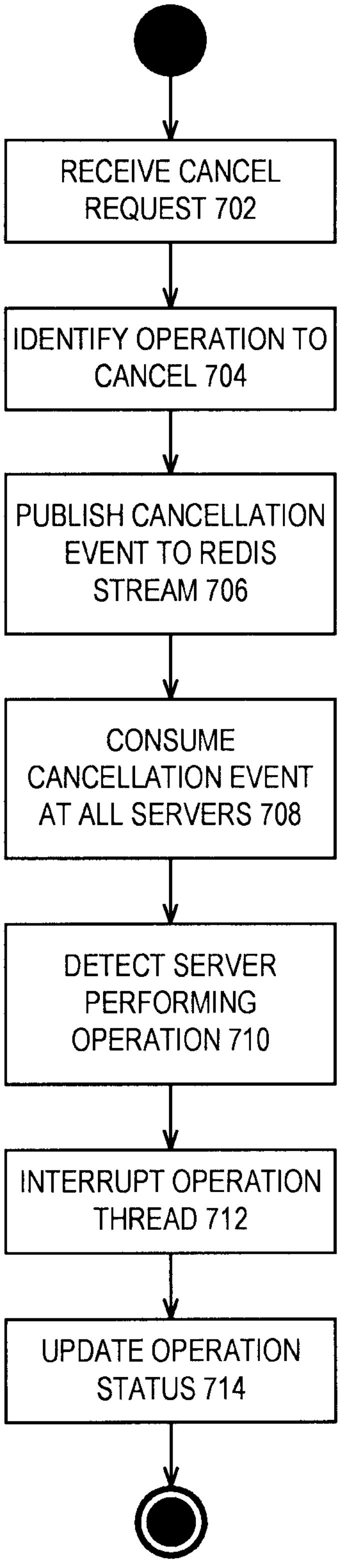
FIG. 7 is a flow diagram illustrating a method for canceling long-running operations across distributed application servers.

FIG. 7 is a flow diagram illustrating a method for canceling long-running operations across distributed application servers.

In step 702, the method can include receiving a cancel request.

This step typically begins when an administrator interacts with the root dashboard UI, identifying a long-running operation that needs to be terminated. The cancel request might be initiated due to various reasons, such as an operation taking longer than expected, consuming excessive resources, or no longer being necessary due to changed circumstances. The root dashboard UI captures the administrator's intent and formulates a structured cancel request. This request would include essential information such as a unique identifier for the operation to be canceled, any associated metadata (e.g., the tenant or user context), and potentially a reason code for the cancellation. The method may also log this request for auditing purposes, recording who initiated the cancellation and when.

In step 704, the method can include identifying the operation to cancel.

Upon receiving the cancel request, the method can determine which specific operation needs to be terminated. This step involves querying the centralized datastore (e.g., datastore 616 in FIG. 6) to retrieve detailed information about the operation. The method can use the unique identifier provided in the cancel request to locate the relevant operation data. This data typically includes the type of operation, its current status, the app server or servers involved in processing it, and any tenant-specific context. The identification process may also involve checking the operation's current state to ensure it's still active and eligible for cancellation. If the operation has already completed or been canceled, the method might need to handle this as a special case, potentially notifying the administrator that the cancellation request is no longer applicable.

In step 706, the method can include publishing a cancellation event to Redis™ stream.

After identifying the operation to be canceled, the method generates a cancellation event. This event is a structured message containing all necessary information for app servers to identify and terminate the specified operation. The event typically includes the operation's unique identifier, any relevant metadata, and a timestamp. The method then publishes this event to a stream (e.g., Redis™ stream), which serves as a distributed message bus for the application cluster. The use of a stream allows for reliable delivery of the event, even if some app servers are temporarily unavailable or experiencing network issues.

In step 708, the method can include consuming the cancellation event at all servers.

Each app server in the cluster maintains a connection to the stream, continuously listening for new events. When the cancellation event is published, all active app servers consume this event almost simultaneously. The consumption process involves reading the event data from the stream and parsing its contents to extract the relevant information about the operation to be canceled. Each server's event handling mechanism is responsible for quickly processing these events, ensuring that cancellation requests are acted upon promptly. The servers may implement techniques such as batching or prioritization to handle high volumes of events efficiently while still ensuring that critical events like cancellations are processed with minimal delay.

In step 710, the method can include detecting the server performing the operation.

Upon consuming the cancellation event, each app server must determine whether it is currently processing the operation that needs to be canceled. This step involves checking the server's local state, active threads, and ongoing processes to identify if the specified operation is running on this particular server. The detection process may involve querying a local operation registry or scanning active worker threads. In a distributed system, it's possible that the operation might have migrated between servers since the cancellation request was initiated, so this check ensures that the cancellation is performed on the correct server. If a server determines it's not handling the specified operation, it can disregard the cancellation event and continue with its normal operations.

In step 712, the method can include interrupting the operation thread.

Once the server performing the operation is identified, it proceeds to interrupt the thread or process executing the operation. This interruption must be handled carefully to maintain system stability and data integrity. The exact mechanism for interrupting the operation may vary depending on the nature of the operation and the programming language or framework in use. It might involve setting a cancellation flag that the operation periodically checks, using language-specific interruption mechanisms (e.g., Thread.interrupt( ) in Java), or sending a signal to the process. The interruption should be designed to allow the operation to perform any necessary cleanup or rollback procedures before terminating. This step may also involve releasing any resources, such as database connections or file handles, that the operation was using.

In step 714, the method can include updating the operation status.

After successfully interrupting the operation, the server must update the status of the operation to reflect its canceled state. This update typically involves modifying the operation's record in both the local server state and the centralized datastore. The status update might include setting a "canceled" flag, recording the time of cancellation, and potentially storing any relevant information about the state of the operation at the time of cancellation. This information is used for providing accurate feedback to administrators and maintaining a clear audit trail of system activities. The status update may also trigger notifications to other parts of the system that might have been waiting for or monitoring the operation's progress.

The method concludes with the operation successfully canceled and its status updated across the distributed system. This process ensures that long-running operations can be effectively managed and terminated when necessary, even in a complex, horizontally scaled environment. By leveraging distributed messaging through Redis™ streams and implementing careful coordination across multiple app servers, the method can provide administrators with powerful control over ongoing operations while maintaining the integrity and stability of the overall application.

Figure 8:
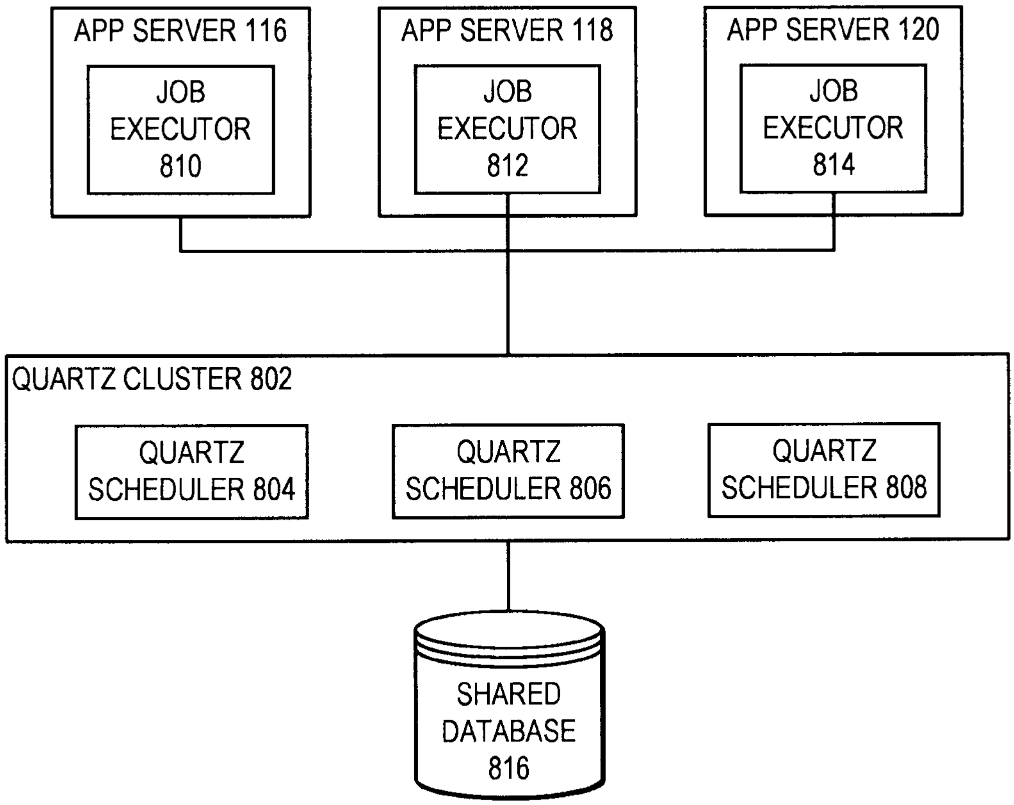
FIG. 8 is a block diagram illustrating a distributed job scheduling system.

FIG. 8 is a block diagram illustrating a distributed job scheduling system. This system is designed to manage and execute background tasks, periodic jobs, and long-running operations across multiple application servers in a scalable and fault-tolerant manner.

The system includes a Quartz cluster 802, which serves as the core of the distributed scheduling system. Quartz is an open-source job scheduling library that is adapted and integrated into the multi-tenant web application architecture to provide robust, distributed scheduling capabilities. The Quartz cluster 802 consists of multiple Quartz scheduler instances: Quartz scheduler 804, Quartz scheduler 806, and Quartz scheduler 808. These schedulers work together as a cohesive unit to manage job scheduling across the entire application cluster. Although Quartz is used as an example, other similar job schedulers may be used and the system can be implemented agnostically as such.

Each Quartz scheduler instance (804, 806, 808) is responsible for maintaining the schedule of jobs, triggering job executions at the appropriate times, and coordinating with other scheduler instances to ensure that jobs are distributed efficiently across the available resources. The multiple scheduler instances provide redundancy and fault tolerance, ensuring that the scheduling system remains operational even if one or more scheduler instances fail.

Connected to the Quartz cluster 802 are multiple app servers, represented in the diagram by app server 116, app server 118, and app server 120. These app servers correspond to the same servers shown in previous figures and represent the distributed nature of the web application architecture. Each app server contains a job executor component, which is responsible for running the jobs scheduled by the Quartz cluster.

App server 116 contains job executor 810, app server 118 contains job executor 812, and app server 120 contains job executor 814. These job executors are designed to receive job execution requests from the Quartz schedulers and carry out the actual work of the scheduled jobs. At the bottom of the diagram is the shared database 816, which plays a role in the distributed job scheduling system. This database serves as a centralized storage location for job definitions, scheduling information, and execution history. By using a shared database, the system ensures that all components have access to consistent and up-to-date information about jobs and their schedules.

The shared database 816 typically contains several tables that aid in the operation of the Quartz cluster. It includes a jobs table that stores the definitions of all jobs in the system, including their names, associated classes, and any parameters they require. The database also has a triggers table that defines when jobs should be executed, including information about scheduling patterns (e.g., cron expressions for periodic jobs) and any dependencies between jobs. Additionally, there is a scheduler state table that keeps track of the current state of each Quartz scheduler instance, allowing the cluster to coordinate activities and detect failed scheduler instances. Finally, the database includes an executed jobs table that maintains a history of job executions, including start and end times, execution outcomes, and any error information for failed jobs.

In some implementations, when a new job needs to be scheduled, it is typically defined through an administrative interface or API call. The job definition, including its implementation class and any required parameters, is stored in the shared database 816. Additionally, one or more triggers are created and stored in the database, specifying when the job should be executed.

The Quartz scheduler instances (804, 806, 808) continuously monitor the shared database 816 for new or updated job definitions and triggers. When a scheduler detects a new job or trigger, it loads this information into its in-memory schedule. The schedulers use a distributed locking mechanism, also implemented through the shared database, to ensure that only one scheduler instance takes responsibility for each job and trigger.

As the scheduled time for a job approaches, the responsible Quartz scheduler instance prepares to trigger the job execution. It first checks the scheduler state table in the shared database 816 to ensure that it is still the active scheduler for this job and that no other instance has taken over due to failover scenarios.

When it's time to execute a job, the Quartz scheduler selects an appropriate app server to run the job. This selection process takes into account factors such as server load, job affinity (if certain jobs are preferred to run on specific servers), and any tenant-specific requirements. The scheduler then sends a job execution request to the selected app server's job executor.

Upon receiving a job execution request, the job executor (e.g., job executor 810 in app server 116) prepares the execution environment for the job. This may involve setting up any required resources, establishing database connections, or loading necessary data. The job executor then invokes the job's implementation class, passing along any parameters specified in the job definition.

As the job runs, the job executor monitors its progress and reports status updates back to the Quartz scheduler. These updates are also recorded in the shared database 816, allowing for real-time monitoring of job execution across the entire cluster. If a job fails or encounters an error, the job executor captures the error information and reports it back to the scheduler, which then decides whether to retry the job or mark it as failed.

Figure 9:
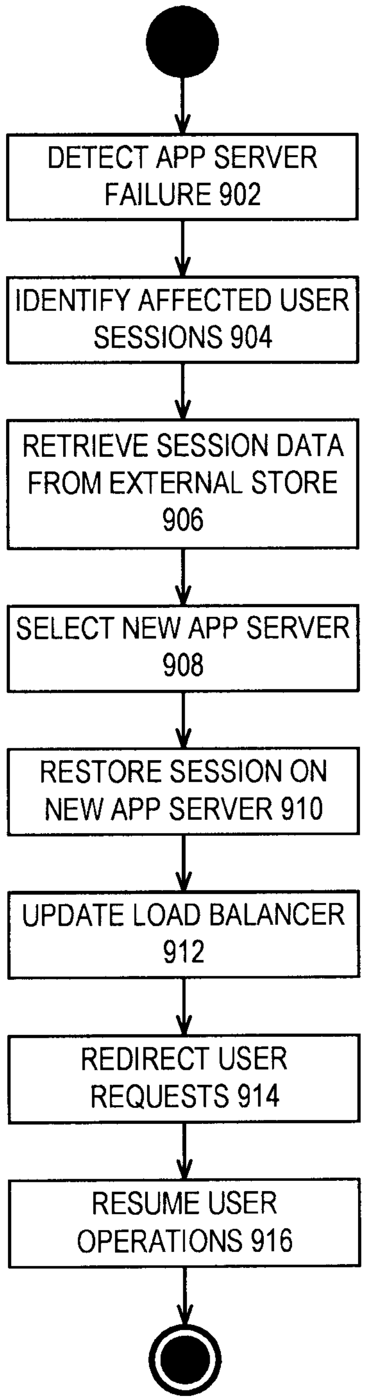
FIG. 9 is a flow diagram illustrating a method for end-user session recovery in a horizontally scaled environment.

FIG. 9 is a flow diagram illustrating a method for end-user session recovery in a horizontally scaled environment. This method is designed to maintain seamless user experiences in the event of an application server failure, ensuring that user sessions can be quickly and efficiently restored on alternative servers without significant disruption to ongoing operations.

In step 902, the method can include detecting an app server failure.

This step involves continuously monitoring the health and status of all application servers in the cluster. Various mechanisms can be employed for failure detection, such as heartbeat signals, periodic health checks, or monitoring of system metrics. When an app server stops responding to health checks, experiences a sudden crash, or shows signs of severe performance degradation, it is flagged as failed. The detection system may employ sophisticated algorithms to differentiate between temporary network issues and actual server failures, potentially implementing a grace period or multiple consecutive failed checks before declaring a server as failed. This robust detection mechanism prevents false positives that could lead to unnecessary session migrations while also ensuring that genuine failures are identified promptly to minimize service disruption.

In step 904, the method can include identifying affected user sessions.

Once an app server failure is confirmed, the method must quickly determine which user sessions were active on the failed server. This information is typically maintained in a centralized session registry or distributed cache that maps session IDs to their corresponding app servers. The method queries this registry to retrieve a list of all sessions that were being handled by the failed server. This step may also involve gathering additional metadata about each session, such as the user's identity, tenant information, and any critical application state that was being maintained. The identification process must be efficient to minimize the delay in session recovery, especially in scenarios with a large number of concurrent users.

In step 906, the method can include retrieving session data from an external store.

With the list of affected sessions identified, the method proceeds to retrieve the full session data for each affected user. In a horizontally scaled environment, session data is typically stored in an external, distributed data store rather than being kept entirely in the memory of individual app servers. This external store, often implemented using technologies like Redis™ or a distributed cache, maintains a serialized version of each user's session state. The retrieval process involves fetching this serialized data for each affected session, which may include user authentication tokens, application-specific state information, and any temporary data that was being processed at the time of the server failure. The method may implement prioritization strategies to retrieve critical session data first, ensuring that the most important user operations can be restored quickly.

In step 908, the method can include selecting a new app server to execute a given user request or operation.

For each affected session, the method must choose a new app server to handle the recovered session. This selection process takes into account various factors to ensure optimal distribution of recovered sessions across the remaining healthy servers in the cluster. Factors considered may include the current load on each server, the geographic proximity to the user (in globally distributed systems), and any tenant-specific routing rules. The selection algorithm aims to balance the load across available servers while also considering performance implications for the end-users. In some cases, the method might also consider server specialization, where certain app servers are optimized for specific types of operations or tenants.

In step 910, the method can include restoring the session on the new app server.

Once a new app server is selected, the method begins the process of restoring the user's session on this server. This involves deserializing the retrieved session data and reconstructing the user's session state within the new app server's memory. The restoration process must carefully recreate all aspects of the user's session, including authentication status, open documents or transactions, and any cached data that was specific to the user's operations. This step may also involve reestablishing any necessary database connections or reacquiring distributed locks that were held by the user's session. The restoration process is designed to be as complete as possible, aiming to place the new app server in a state that is indistinguishable from the failed server from the user's perspective.

In step 912, the method can include updating the load balancer.

With the session successfully restored on the new app server, the method must update the load balancer to ensure that subsequent requests from the affected user are routed to the correct server. This update typically involves modifying the session-to-server mapping in the load balancer's configuration. In systems using sticky sessions, this might mean updating the rules that associate specific session cookies with particular app servers. The update process must be quick and atomic to prevent any requests from being routed to the failed server or to an incorrect new server during the transition. Some advanced load balancing systems might also adjust their overall routing algorithms at this point to account for the changed distribution of sessions across the remaining servers.

In step 914, the method can include redirecting user requests.

Once the load balancer is updated, all new incoming requests for the affected users are automatically directed to their newly assigned app servers. This redirection should be transparent to the end-users, with no visible interruption in their interaction with the application. The method may implement additional checks at this stage to ensure that the first few requests to the new server are handled correctly, potentially with increased monitoring or logging to quickly identify any issues with the restored session. In some cases, especially for critical operations, the method might include a brief validation step to confirm that the user's state has been correctly restored before allowing complex transactions to proceed.

In step 916, the method can include resuming user operations.

The final step involves allowing the user to continue their operations seamlessly on the new app server. From the user's perspective, this transition should appear as nothing more than a momentary pause or slight delay in response time. The restored session on the new server should be fully functional, with all previous user context, open documents, and in-progress operations intact. The method may provide subtle notifications to users about the occurrence of a brief interruption, especially in scenarios where real-time collaboration or time-sensitive operations are involved. Additionally, the method might implement a short period of enhanced monitoring for recovered sessions to quickly detect and address any anomalies that may arise from the session migration process.

This method for end-user session recovery in a horizontally scaled environment demonstrates the resilience and fault-tolerance capabilities of the method. By quickly detecting server failures, efficiently migrating user sessions, and seamlessly redirecting user traffic, the method can maintain high availability and user satisfaction even in the face of hardware or software failures. This approach is useful in multi-tenant environments where maintaining consistent and uninterrupted service for all users is paramount to the application's success and reliability.

Figure 10:
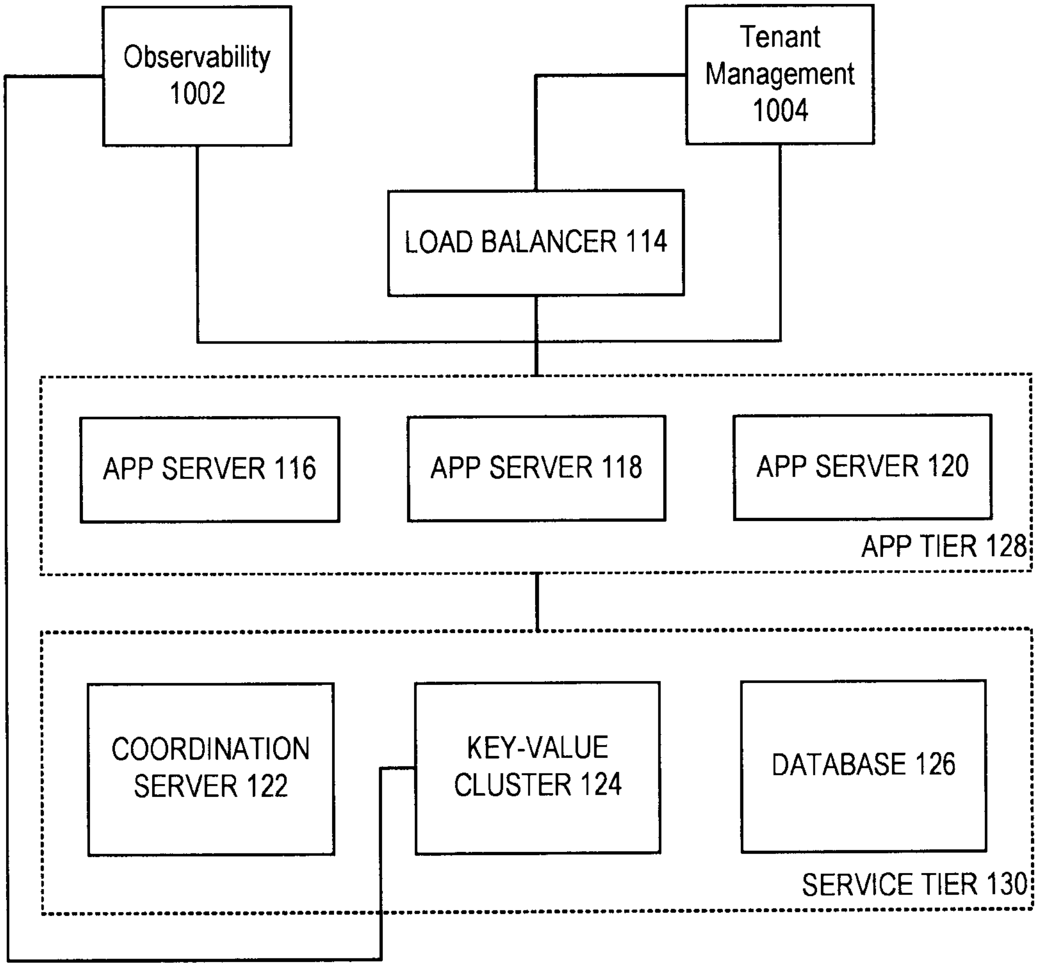
FIG. 10 is a block diagram illustrating an architecture for merging application server endpoints.

The session externalization process aims to improve user experience in the event of app server crashes. By storing session data externally, if an app server fails during a long-running operation (e.g., a 2-3 minute task), the session can be quickly restored on another app server once the system recovers. This allows users to continue their work without losing progress or needing to log in again, enhancing system resilience and maintaining a seamless user experience in the face of potential failures FIG. 10 is a block diagram illustrating an architecture for merging application server endpoints. This architecture represents an evolution of the system described in previous figures, aimed at optimizing resource utilization, improving scalability, and enhancing overall system flexibility.

The system includes the observability system 1002 and the tenant management system 1004. These components interact with the load balancer 114, which serves as the central point for routing incoming requests to the appropriate application servers.

The observability system 1002 is responsible for monitoring and analyzing the performance and behavior of the entire application ecosystem. It collects metrics, logs, and traces from all components of the system, including the app servers, load balancer, and backend services. This comprehensive monitoring allows for real-time insight into system health, performance bottlenecks, and potential issues. The observability system may employ advanced analytics and machine learning algorithms to detect anomalies, predict potential failures, and provide actionable insights for system optimization. By integrating closely with the load balancer 114, the observability system can influence routing decisions based on current performance metrics, ensuring that traffic is directed to the most efficient and responsive app servers.

The tenant management system 1004 enables control over how different tenants are handled within the merged application server environment. This system maintains information about each tenant, including their service level agreements, resource requirements, and any specific routing or isolation needs. The tenant management system interfaces with the load balancer 114 to implement tenant-specific routing policies. For example, high-priority tenants might be routed to dedicated or less-loaded app servers, while tenants with lower resource requirements might share server resources more freely. This granular control allows for better resource allocation and can help prevent the "noisy neighbor" problem in multi-tenant environments.

The load balancer 114, enhanced with inputs from both the observability system 1002 and the tenant management system 1004, becomes an even more intelligent component in the architecture. It can make routing decisions based not only on server health and response times but also on tenant-specific policies and real-time performance data. This advanced load balancing can dynamically adjust to changing conditions, such as sudden spikes in traffic from particular tenants or temporary resource constraints on specific app servers.

Below the load balancer is app tier 128, which contains multiple application servers: app server 116, app server 118, and app server 120. In this merged endpoint architecture, these app servers are no longer dedicated to specific tenants or groups of tenants. Instead, they form a flexible pool of resources capable of handling requests from any tenant. This approach allows for more efficient resource utilization and easier scaling of the application tier. When traffic increases, new app servers can be added to the pool without the need to reconfigure tenant-to-server mappings. Similarly, if traffic decreases, servers can be removed from the pool without disrupting specific tenants.

The service tier 130 includes coordination server 122, key-value cluster 124, and database 126. However, in this merged endpoint scenario, these backend services take on even greater importance in maintaining consistency and managing shared state across the more dynamic app server environment.

The coordination server 122, can be implemented using a technology like Apache ZooKeeper. With requests from any tenant potentially being handled by any app server, robust distributed locking mechanisms are needed to prevent data races and ensure consistency.

The key-value cluster 124 provides shared storage for session data, caches, and other ephemeral information. With app servers now handling requests from multiple tenants, the ability to quickly store and retrieve session and cache data becomes even more critical. The key-value cluster may implement more sophisticated partitioning and replication strategies to handle the increased load and diversity of data.

The database 126 continues to act as the primary persistent storage for the application. In the merged endpoint architecture, the database schema and access patterns may need to be optimized to handle more varied query patterns, as any app server may need to access data for any tenant. This might involve implementing more aggressive caching strategies, optimizing indexes, or even considering a polyglot persistence approach where different types of data are stored in specialized databases optimized for specific access patterns.

Figure 11:
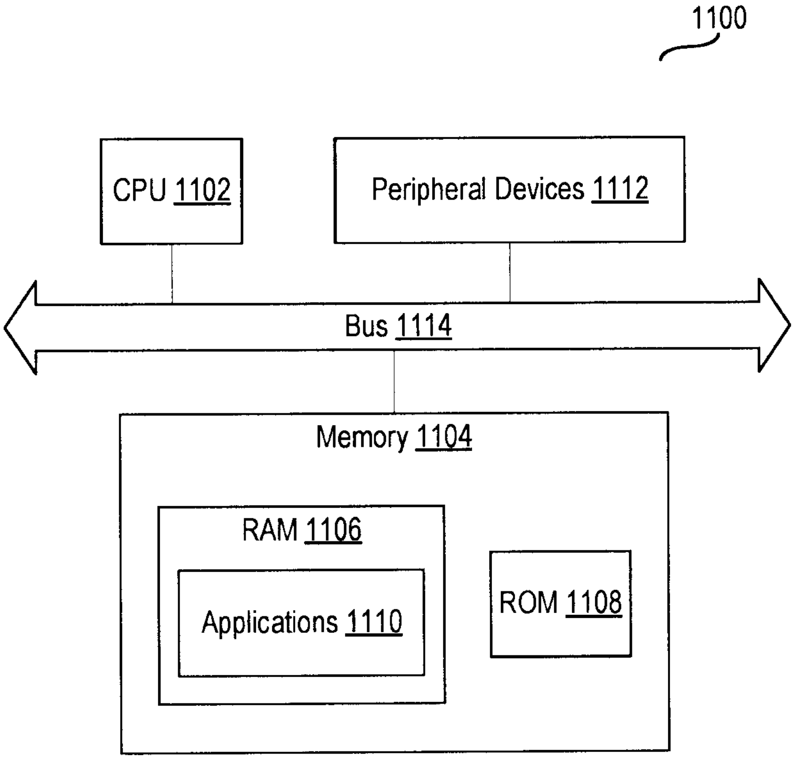
FIG. 11 is a block diagram illustrating a computing device.

FIG. 11 is a block diagram of a computing device according to some embodiments of the disclosure.

As illustrated, the device 1100 includes a processor or central processing unit (CPU) such as CPU 1102 in communication with a memory 1104 via a bus 1114. The device also includes one or more input/output (I/O) or peripheral devices 1112. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 1102 may comprise a general-purpose CPU. The CPU 1102 may comprise a single-core or multiple-core CPU. The CPU 1102 may comprise a system-on-a-chip (SoC) or a similar embedded system. In some embodiments, a graphics processing unit (GPU) may be used in place of, or in combination with, a CPU 1102. Memory 1104 may comprise a memory system including a dynamic random-access memory (DRAM), static random-access memory (SRAM), Flash (e.g., NAND Flash), or combinations thereof. In one embodiment, the bus 1114 may comprise a Peripheral Component Interconnect Express (PCIe) bus. In some embodiments, the bus 1114 may comprise multiple busses instead of a single bus.

Memory 1104 illustrates an example of a non-transitory computer storage media for the storage of information such as computer-readable instructions, data structures, program modules, or other data. Memory 1104 can store a basic input/output system (BIOS) in read-only memory (ROM), such as ROM 1108 for controlling the low-level operation of the device. The memory can also store an operating system in random-access memory (RAM) for controlling the operation of the device.

Applications 1110 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 1106 by CPU 1102. CPU 1102 may then read the software or data from RAM 1106, process them, and store them in RAM 1106 again.

The device may optionally communicate with a base station (not shown) or directly with another computing device. One or more network interfaces in peripheral devices 1112 are sometimes referred to as a transceiver, transceiving device, or network interface card (NIC).

An audio interface in peripheral devices 1112 produces and receives audio signals such as the sound of a human voice. For example, an audio interface may be coupled to a speaker and microphone (not shown) to enable telecommunication with others or generate an audio acknowledgment for some action. Displays in peripheral devices 1112 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 1112 may comprise any input device arranged to receive input from a user. An illuminator in peripheral devices 1112 may provide a status indication or provide light. The device can also comprise an input/output interface in peripheral devices 1112 for communication with external devices, using communication technologies, such as USB, infrared, Bluetooth®, or the like. A haptic interface in peripheral devices 1112 provides tactile feedback to a user of the client device.

A GPS receiver in peripheral devices 1112 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the method or of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

determining via a coordination server managing locks across a plurality of application servers in a multi-tenant environment, whether a distributed lock is available for an operation on a shared resource;

acquiring the distributed lock when available by generating a fencing token associated with the distributed lock, the fencing token being a monotonically increasing value managed by the coordination server;

verifying the fencing token by a given application server prior to performing the operation on the shared resource;

invalidating cached data across application servers after performing the operation, the cache invalidation being triggered by the given application server that performs the operation; and releasing the distributed lock to the coordination server after the operation, allowing other application servers to acquire the distributed lock.

2. The method of claim 1, further comprising: detecting a data change in one application server; generating a cache invalidation event associated with the data change; publishing the cache invalidation event to a distributed messaging system; and consuming the cache invalidation event on multiple application servers to invalidate cached data.

3. The method of claim 1, further comprising: receiving a request to cancel a long-running operation on an application server; identifying the operation associated with the request; publishing a cancellation event to a distributed messaging system; consuming the cancellation event at the application server; and interrupting the long-running operation.

4. The method of claim 1, further comprising: detecting a failure of an application server; identifying affected user sessions on the application server; retrieving session data from an external session store; and restoring the affected user sessions on an available application server.

5. The method of claim 1, wherein the coordination server implements a hierarchical locking mechanism, wherein locks are applied at different levels of data objects, including individual records, tables, and tenant-specific resources, within the multi-tenant environment.

6. The method of claim 1, further comprising assigning tenants to specific application servers dynamically, based on a current load and predefined service level agreements, wherein a load balancer adjusts a distribution of tenants in response to changes in resource availability and server performance.

7. The method of claim 1, wherein the fencing token is generated as a monotonically increasing value, wherein the given application server holding the distributed lock presents the fencing token before modifying the shared resource, and a modification is executed only if the fencing token corresponds to a most recent token issued for the distributed lock.

8. A non-transitory computer-readable storage medium for tangibly storing computer program instructions capable of being executed by a computer processor, the computer program instructions defining steps of:

determining, via a coordination server managing locks across a plurality of application servers in a multi-tenant environment, whether a distributed lock is available for an operation on a shared resource;

acquiring the distributed lock when available by generating a fencing token associated with the distributed lock, the fencing token being a monotonically increasing value managed by the coordination server;

verifying the fencing token by a given application server prior to performing the operation on the shared resource;

invalidating cached data across application servers after performing the operation, the cache invalidation being triggered by the given application server that performs the operation; and releasing the distributed lock to the coordination server after the operation, allowing other application servers to acquire the distributed lock.

9. The non-transitory computer-readable storage medium of claim 8, the steps further comprising: detecting a data change in one application server; generating a cache invalidation event associated with the data change; publishing the cache invalidation event to a distributed messaging system; and consuming the cache invalidation event on multiple application servers to invalidate cached data.

10. The non-transitory computer-readable storage medium of claim 8, the steps further comprising: receiving a request to cancel a long-running operation on an application server; identifying the operation associated with the request; publishing a cancellation event to a distributed messaging system; consuming the cancellation event at the application server; and interrupting the long-running operation.

11. The non-transitory computer-readable storage medium of claim 8, the steps further comprising: detecting a failure of an application server; identifying affected user sessions on the application server; retrieving session data from an external session store; and restoring the affected user sessions on an available application server.

12. The non-transitory computer-readable storage medium of claim 8, wherein the coordination server implements a hierarchical locking mechanism, wherein locks are applied at different levels of data objects, including individual records, tables, and tenant-specific resources, within the multi-tenant environment.

13. The non-transitory computer-readable storage medium of claim 8, the steps further comprising assigning tenants to specific application servers dynamically, based on a current load and predefined service level agreements, wherein a load balancer adjusts a distribution of tenants in response to changes in resource availability and server performance.

14. The non-transitory computer-readable storage medium of claim 8, wherein the fencing token is generated as a monotonically increasing value, wherein the given application server holding the distributed lock presents the fencing token before modifying the shared resource, and a modification is executed only if the fencing token corresponds to a most recent token issued for the distributed lock.

15. A system comprising:

a processor; and a storage medium for tangibly storing thereon program logic for execution by the processor, the program logic comprising steps for:

determining, via a coordination server managing locks across a plurality of application servers in a multi-tenant environment, whether a distributed lock is available for an operation on a shared resource;

acquiring the distributed lock when available by generating a fencing token associated with the distributed lock, the fencing token being a monotonically increasing value managed by the coordination server;

verifying the fencing token by a given application server prior to performing the operation on the shared resource;

invalidating cached data across application servers after performing the operation, the cache invalidation being triggered by the given application server that performs the operation; and releasing the distributed lock to the coordination server after the operation, allowing other application servers to acquire the distributed lock.

16. The system of claim 15, the steps further comprising: detecting a data change in one application server; generating a cache invalidation event associated with the data change; publishing the cache invalidation event to a distributed messaging system; and consuming the cache invalidation event on multiple application servers to invalidate cached data.

17. The system of claim 15, the steps further comprising: receiving a request to cancel a long-running operation on an application server; identifying the operation associated with the request; publishing a cancellation event to a distributed messaging system; consuming the cancellation event at the application server; and interrupting the long-running operation.

18. The system of claim 15, the steps further comprising: detecting a failure of an application server; identifying affected user sessions on the application server; retrieving session data from an external session store; and restoring the affected user sessions on an available application server.

19. The system of claim 15, wherein the coordination server implements a hierarchical locking mechanism, wherein locks are applied at different levels of data objects, including individual records, tables, and tenant-specific resources, within the multi-tenant environment.

20. The system of claim 15, the steps further comprising assigning tenants to specific application servers dynamically, based on a current load and predefined service level agreements, wherein a load balancer adjusts a distribution of tenants in response to changes in resource availability and server performance.

* * * * *